United States Patent [19]

Miller et al.

[11] Patent Number: 5,596,269
[45] Date of Patent: Jan. 21, 1997

[54] APPARATUS AND METHOD FOR TESTING ELECTRICAL SWITCH MATRICES

[75] Inventors: Philip Miller, Palatine; Joseph Tobin, Wauconda; Edward Dadiomov, Buffalo Grove, all of Ill.

[73] Assignee: Motorola, Inc., Schaumburg, Ill.

[21] Appl. No.: 577,078

[22] Filed: Dec. 22, 1995

[51] Int. Cl.$^6$ .................................................. G01R 31/02
[52] U.S. Cl. ........................... 324/73.1; 324/537; 324/538
[58] Field of Search .................................. 324/537, 538, 324/555, 73.1, 770, 418, 415; 371/22.1, 22.3, 25.1, 24; 340/514, 518, 522, 825.16, 825.79, 644

[56] References Cited

U.S. PATENT DOCUMENTS

| | | | |
|---|---|---|---|
| 3,705,349 | 12/1972 | Arnold | 324/538 X |
| 4,241,307 | 12/1980 | Hong | 324/538 X |
| 4,485,467 | 11/1984 | Miles et al. | 370/14 |
| 4,573,152 | 2/1986 | Greene et al. | 371/24 X |
| 4,719,411 | 1/1988 | Buehler | 324/73.1 |
| 5,243,272 | 9/1993 | Hall et al. | 324/73.1 |
| 5,446,370 | 8/1995 | Voight | 324/76.11 |
| 5,486,766 | 1/1996 | Hibdon et al. | 324/537 |

Primary Examiner—Maura K. Regan
Assistant Examiner—Diep Do
Attorney, Agent, or Firm—Heather L. Creps

[57] ABSTRACT

The apparatus for testing electrical switch matrices includes a potential selector (30) for receiving and applying a voltage (28) to a predetermined input (101–106) of each of the plurality of electrical switches (12), a controller (15) for receiving and applying signals to the plurality of electrical switches (12), and a combiner (36) responsive to an output (22) of each of the plurality of electrical switches (12). The controller (15) selects electrical paths (16) associated with each of the switches (12) which are in communication with the predetermined inputs (101–106) of each of the switches. The output (38) of the combiner (36) indicates whether at least one of the selected electrical paths (16) failed.

20 Claims, 2 Drawing Sheets

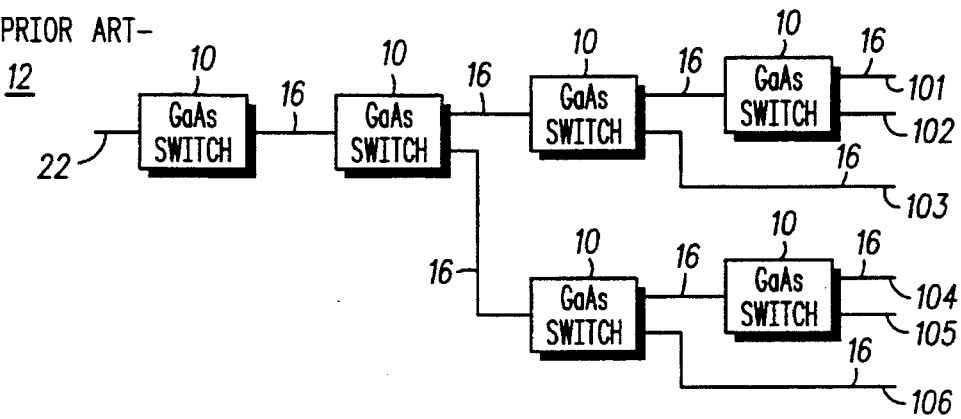
FIG. 1 -PRIOR ART-
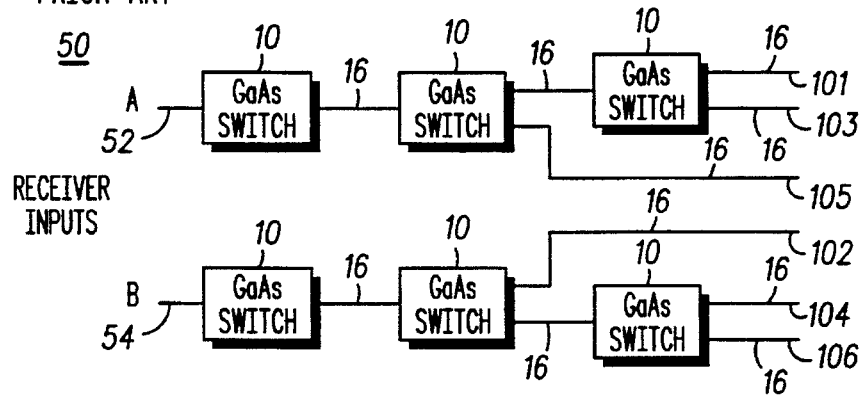
FIG. 2 -PRIOR ART-
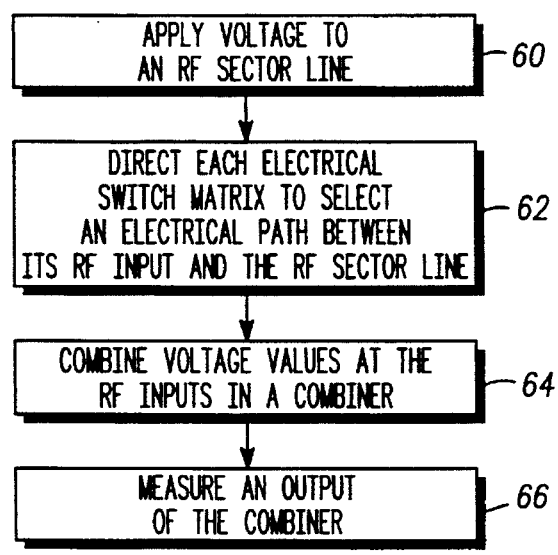
FIG. 4

APPARATUS AND METHOD FOR TESTING ELECTRICAL SWITCH MATRICES

FIELD OF THE INVENTION

This invention relates generally to signal measurement systems for electrical components, and, more particularly, to an apparatus and method for testing electrical switch matrices.

BACKGROUND OF THE INVENTION

In a typical cellular radio frequency (RF) communications system such as a radiotelephone system, a base station employing transmitters and receivers (transceivers) establishes communication to mobile stations within a cell served by the base station. The cell served by the base station may include one or more sectors. Each sector generally includes at least one antenna for servicing one or more communications channels. Communications channels may be, for example, frequency channels, time slots within the same frequency such as in a Time Division Multiple Access (TDMA) system, or spread spectrum channels, as found in a Code Division Multiple Access (CDMA) system.

At the base station, RF signals may be routed between any one of a number of transceivers and a communications channel serviced by one of the sectors. An RF switch matrix which includes a number of individual switches and may be located on a matrix board having multiple switch matrices is generally utilized to direct the RF signals between the transceivers and the appropriate sectors.

An RF switch matrix's performance may be negatively affected by electrostatic discharge (ESD). ESD damage often occurs during shipping and handling prior to installation. For example, ESD may cause a switch within the switch matrix to remain in one position (i.e., either open or closed), or to fail to pass a signal, resulting in the misdirection or blockage of RF communications. Even if a switch matrix is operational when installed, ESD may have significantly shortened the switch matrix's life.

Thus, field engineers responsible for installing matrix boards containing switch matrices may be required to test each electrical path in each switch matrix manually, often using external RF equipment and complicated software.

One system for verifying the output of switch matrices utilized in RF communications systems is disclosed in U.S. Pat. No. 5,446,370 to Voight. The Voight patent teaches using external equipment including, among other things, a transceiver, a spectrum analyzer and a computer to determine whether an RF switch matrix directed any one of N RF signals to any one of M sectors. The determination is based on a predetermined power level of an input signal, a measured power of an output signal and a relationship between levels of attenuation in an attenuator bank.

SUMMARY OF THE INVENTION

According to the present invention, the foregoing problems are ameliorated by a method of testing a plurality of electrical switch matrices having a plurality of inputs, including the steps of providing a voltage to a first input of each of the plurality of electrical switch matrices, selecting the first input of each of the plurality of electrical switch matrices, combining an output of each electrical switch matrix in a combiner, and measuring an output of the combiner.

In accordance with another embodiment of the present invention, an apparatus for testing a plurality of electrical switches includes a potential selector for receiving and applying a voltage to a predetermined input of each of the plurality of electrical switches; a controller for receiving and applying signals to each of the plurality of electrical switches, the controller selecting an electrical path associated with each of the plurality of electrical switches, the selected electrical paths being in communication with the predetermined inputs of each of the plurality of electrical switches; and a combiner responsive to an output of each of the plurality of electrical switches, the combiner measuring the output of each of the plurality of electrical switches.

Other advantages of the present invention will become readily apparent to those skilled in the art from the following description of the preferred embodiment of the invention which has been shown and described by way of illustration. As will be realized, the invention is capable of other and different embodiments, and its details are capable of modifications in various obvious respects. Accordingly, the drawings and description are to be regarded as illustrative in nature, and not as restrictive.

BRIEF DESCRIPTION OF THE DRAWINGS

FIG. 1 illustrates a typical RF switch matrix for a transmitter portion of a base station transceiver.

FIG. 2 illustrates a typical RF switch matrix for a receiver portion of a base station transceiver.

FIG. 4 is a flowchart outlining a method of testing a plurality of electrical switch matrices in accordance with the preferred embodiment of the present invention.

DETAILED DESCRIPTION OF THE PREFERRED EMBODIMENT

Figure 3:
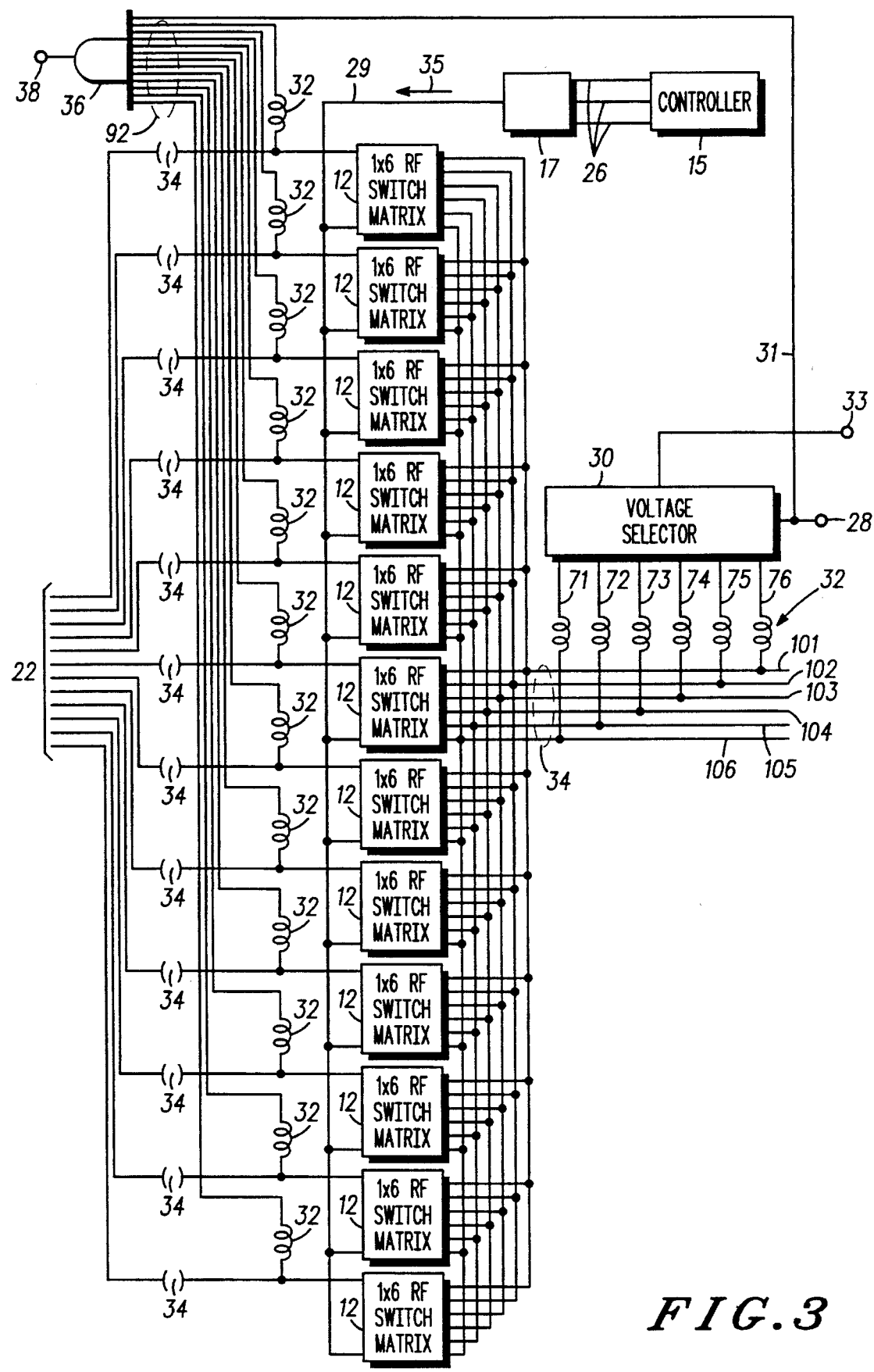
FIG. 3 illustrates RF path self-diagnostics circuitry for a transmitter portion of a base station transceiver switch matrix capable of utilizing the preferred embodiment of the present invention.

Turning now to the drawings, wherein like numerals designate like components, FIG. 1 illustrates a typical RF switch matrix 12 for a transmitter portion of a base station transceiver (not shown). Each 1×6 switch matrix 12 preferably includes a plurality of switches 10, for example six single-pole double-throw (SPDT) GaAs field effect transistors (FETs). A single switch matrix 12 can create an electrical path 16 from a transmitter input signal 22 to any one of six RF sector lines 101–106. As shown, electrical paths 16 connect input signals 22 with RF sector lines 101–106. GaAs switches 10 are preferably bi-directional switches without internal direct current blocking, which will pass direct current as well as RF signals. Suitable switches are commercially available from Alpha Industries, part number AC282-9A.

FIG. 2 illustrates a typical RF switch matrix 50 for a receiver portion of a base station transceiver. A typical receive matrix board (not shown) includes twelve receivers divided into two banks (not shown) and six RF sector lines 101–106. The RF sector lines on the receive matrix board are equivalent to the RF sector lines on the transmit matrix board. A switch matrix 50 may direct three RF sector lines to one of the twelve RF receivers in one bank and three RF sector lines to one of the twelve RF receivers in the other bank.

Each 1×6 switch matrix 50 preferably includes six SPDT GaAs switches 10. A single switch matrix 50 as shown creates electrical paths 16 between any one of the three RF sector lines 101, 103 and 105 and a receiver input A 52, and similarly electrically connects RF sector lines 102, 104 and 106 to a receiver input B 54.

FIG. 3 is a partial schematic electrical diagram of a Motorola SC9600 base station matrix board, illustrating RF path self-diagnostic circuitry for a transmitter portion of a base station transceiver switch matrix according to the preferred embodiment of the present invention. As shown, a switch matrix includes a plurality of electrical switch matrices 12, preferably twelve 1×6 switch matrices 12. Inputs 22 from twelve RF transmitters (not shown) may be dynamically switched to one of six RF sector lines 101–106 via the switch matrices 12.

During normal RF operation, when one of the inputs 22 from a base station RF transmitter requires switching to a particular RF sector line 101–106, serial control data (not shown) may be generated by a controller 15, applied to control lines 26, then sent by a data splitter 17 as a signal 35 via line (or lines) 29 to RF switch matrices 12. The control data instructs a specific RF switch matrix 12 to direct an input 22 associated with that switch matrix 12 to a particular RF sector line 101–106.

In the preferred embodiment of the present invention, RF input signals 22 from twelve transmitters may be switched to one of six different RF sector lines 101–106, such that a total of seventy-two electrical paths are possible.

Diagnostics circuitry preferably tests each of the seventy-two electrical paths. A voltage (potential) selector 30 controlled via control line (or lines) 33 receives a voltage (potential) 28 and applies voltage 28 via selector output lines 71–76 to one of the RF sector lines 101–106 at a time. Voltage 28 is preferably a direct current (DC) voltage from a low impedance voltage source (not shown). High impedance RF chokes 32 such as inductors may be used to inject and recover voltage 28 onto the RF paths. Blocking caps 34 may be placed on all inputs and outputs of the matrix board under test.

Next, controller 15 instructs each RF switch matrix 12 to create an electrical path between its respective transmitter input 22 and the RF sector line 101–106 under test. The direct current voltage values at RF transmitter inputs 22 are obtained by DC lines 92 and are input to a combiner 36, which may be, among other things, an AND gate, to determine if any of the electrical paths associated with the RF sector line 101–106 under test failed. Along with the voltage values at transmitter inputs 22, voltage 28 may also be input to combiner 36 via line 31.

If all electrical paths from transmitter inputs 22 to the RF sector line 101–106 under test are operational, an output 38 of combiner 36 will be "high". For example, output 38 may be proportional to the value of the direct current voltage 28. If one or more electrical paths failed, however, output 38 of combiner 36 will be "low", for example, zero volts.

All or some of the diagnostic circuitry such as voltage selector 30, controller 15 and combiner 38 may be external to the board housing the RF switch matrices 12. For example, a computer capable of sending generic line interface (GLI) signals through an interface port may be utilized. Alternatively, all or some of the diagnostic circuitry may be permanently affixed to the board.

As will be appreciated by those skilled in the art, there exist numerous ways of combining the direct current voltage values at RF transmitter inputs 22 verify one or more electrical paths between transmitter inputs 22 and RF sector lines 101–106. For example, instead of using a single combiner 36, a plurality of combiners may be used to test each switch matrix 12 individually, and, if a failure occurred, to further pinpoint the location of the failure.

Thus, as illustrated in the flowchart of FIG. 4, a method for testing a plurality of electrical switch matrices includes the steps of applying a voltage to an RF sector line as shown in block 60, directing each electrical switch matrix to select an electrical path between its respective RF input and an RF sector line under test as depicted in block 62, combining, at block 64, voltage values at the RF inputs in a combiner, and measuring an output of the combiner at block 66, to determine if any of the electrical paths associated with the RF sector line under test failed.

The diagnostic circuitry and method described herein facilitates detection of switch failures because RF paths may be verified without using external RF equipment. This results, among other things, in significant cycle time reduction during installation and maintenance.

As will be appreciated by one skilled in the art, the principles of the present invention which apply to the illustrated matrix board are also applicable to any board or module with switches having a plurality of input and output signals, such as a receive matrix board.

It will be apparent that other and further forms of the invention may be devised without departing from the spirit and scope of the appended claims, and it will be understood that this invention is not to be limited to the specific embodiments shown.

We claim:

1. A method of testing a plurality of electrical switch matrices having a plurality of inputs, comprising the steps of:

applying a voltage to a first input of the plurality of electrical switch matrices;

selecting the first input of each of the plurality of electrical switch matrices;

combining an output of each of the plurality of electrical switch matrices in a combiner; and measuring an output of the combiner.

2. The method of testing a plurality of electrical switch matrices according to claim 1, the step of combining the output of each of the plurality of electrical switch matrices in the combiner further comprising the step of combining the voltage in the combiner.

3. The method of testing a plurality of electrical switch matrices according to claim 1, wherein the voltage comprises a direct current voltage.

4. The method of testing a plurality of electrical switch matrices according to claim 1, wherein the combiner comprises an AND gate.

5. The method of testing a plurality of electrical switch matrices according to claim 1, wherein the combiner comprises a plurality of AND gates.

6. The method of testing a plurality of electrical switch matrices according to claim 1, wherein each of the plurality of electrical switch matrices comprises a plurality of field effect transistors.

7. The method of testing a plurality of electrical switch matrices according to claim 6, wherein each of the plurality of field effect transistors comprises a GaAs FET.

8. An apparatus for testing a plurality of electrical switches, each of the plurality of electrical switches comprising a plurality of electrical paths and having a plurality of inputs and an output, the apparatus comprising:

a potential selector for receiving and applying a voltage to a predetermined input of each of the plurality of electrical switches;

a controller for receiving and applying a signal to each of the plurality of electrical switches, the controller selecting an electrical path associated with each of the plurality of electrical switches, each selected electrical path being in communication with the predetermined input of each of the plurality of electrical switches; and a combiner responsive to the output of each of the plurality of electrical switches, wherein the combiner measures the output of each of the plurality of electrical switches.

9. The apparatus for testing a plurality of electrical switches according to claim 8, wherein the combiner determines whether at least one of the selected electrical paths failed.

10. The apparatus for testing a plurality of electrical switches according to claim 8, wherein the plurality of electrical paths are radio-frequency signal paths.

11. The apparatus for testing a plurality of electrical switches according to claim 8, wherein the plurality of electrical paths are digital signal paths.

12. The apparatus for testing a plurality of electrical switches according to claim 8, wherein the plurality of electrical paths are direct current signal paths.

13. The apparatus for testing a plurality of electrical switches according to claim 8, wherein the voltage applied to the predetermined input of each of the plurality of electrical switches comprises a direct current voltage.

14. The apparatus for testing a plurality of electrical switches according to claim 8, wherein the plurality of electrical switches comprises a plurality of field effect transistors.

15. The apparatus for testing a plurality of electrical switches according to claim 14, wherein each of the plurality of field effect transistors comprises a GaAs FET.

16. The apparatus for testing a plurality of electrical switches according to claim 8, wherein the combiner comprises an AND gate.

17. The apparatus for testing a plurality of electrical switches according to claim 8, wherein the potential selector is remotely connectable to the predetermined inputs of each of the plurality of electrical switches, and wherein the potential selector applies the voltage when connected to the predetermined inputs of each of the plurality of electrical switches.

18. The apparatus for testing a plurality of electrical switches according to claim 8, wherein the controller is remotely connectable to each of the plurality of electrical switches, and wherein the controller applies the signal to each of the plurality of electrical switches when connected to each of the plurality of electrical switches.

19. The apparatus for testing a plurality of electrical switches according to claim 8, wherein the combiner is remotely connectable to the output of each of the plurality of electrical switches, and wherein the combiner is responsive to the output of each of the plurality of electrical switches when connected to the output of each of the plurality of electrical switches.

20. An apparatus for testing a plurality of electrical switches, each of the plurality of electrical switches comprising a plurality of electrical paths and having a plurality of switch inputs and a switch output, the apparatus comprising:

a potential selector having a first control line, a selector input and a plurality of selector outputs, wherein a voltage being received by the selector input is applied to a predetermined switch input of each of the plurality of electrical switches by the potential selector via one of the plurality of selector outputs of the potential selector;

a controller having a second control line in communication with each of the plurality of electrical switches, a signal being received by the second control line, the signal being applied to each of the plurality of electrical switches via the second control line, the controller thereby selecting an electrical path associated with each of the plurality of electrical switches, each selected electrical path being in communication with the predetermined switch inputs of each of the plurality of electrical switches; and a combiner responsive to the switch outputs of each of the plurality of electrical switches, the combiner measuring the switch outputs of each of the plurality of electrical switches, wherein the combiner determines whether at least one of the selected electrical paths failed.

\* \* \* \* \*